Patented May 10, 1949

2,469,830

UNITED STATES PATENT OFFICE 2,469,830

2-BIS(5-CYCLYLPYRROLE)AZAMETHINE DYES

Edward Bowes Knott, Harrow, Wealdstone, England, assignor to Eastman Kodak Company, Rochester, N. Y., a corporation of New Jersey No Drawing. Application May 17, 1947, Serial No. 748,839. In Great Britain May 31, 1946

19 Claims. (Cl. 260—313)

This invention relates to 2-bis(5-cyclylpyrrole)azamethine dyes and to a process for preparing the same.

2 - bis(3:5 - diphenylpyrrole)azamethine dyes (also called 2:2′:4:4′ - tetraphenylazadipyrromethines) have been described in United States Patent No. 2,382,914, dated August 14, 1945. These known dyes can be represented by the following general formula:

I:

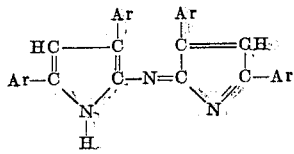

wherein Ar represents a phenyl group which may be substituted with chlorine, methyl, dimethylamino, nitro, etc. These known dyes are prepared by the interaction of β-aroyl-α-arylpropionitriles with an agent which yields ammonia, e. g. formamide, urea, ammonium formate, ammonium phosphate and ammonium carbamate.

I have now found that the aforesaid known 2-bis(3:5-diarylpyrrole)azamethine dyes can be prepared by the interaction of β-aroyl-α-arylpropionitriles with hydroxylamine salts. Moreover, I have found that β-cycloylpropionitriles, in general, react with hydroxylamine salts to give 2-bis(5-cyclylpyrrole)azamethine dyes whether or not the β-cycloylpropionitrile contains an aryl group in the α-position, so that by my new process many new dyes are made available.

It is, accordingly, an object of my invention to provide a process for preparing 2-bis(5-cyclylpyrrole)azamethine dyes. A further object is to provide new dyes. Other objects will become apparent hereinafter.

In accordance with my invention, I prepare 2-bis(5-cyclylpyrrole)azamethine dyes which can be represented by the following general formula:

II.

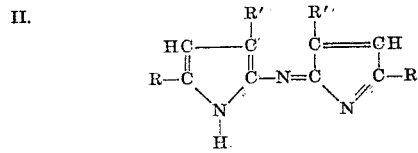

wherein R represents a cyclyl group, e. g. a monocyclic aryl group of the benzene series, especially such a group having an atomic weight from the atomic weight of the phenyl group to the atomic weight of the p-iodophenyl group, for instance, the phenyl group, the p-tolyl group, the m-tolyl group, the p-nitrophenyl group, the p-anisyl group, the p-phenetyl group, the p-chlorophenyl group, the p-bromophenyl group, the p-iodophenyl group, etc., or R represents an aryl group of the naphthalene series, e. g. 1-naphthyl or 2-naphthyl, or R represents a heterocyclic group, e. g. a 2-thienyl group, R′ represents a hydrogen atom, an alkyl group, e. g. methyl, or an aryl group, e. g. phenyl, p-chlorophenyl, p-tolyl, 1-naphthyl, 2-naphthyl, etc. The dyes of the above Formula II in which R′ represents a hydrogen atom are new dyes which were heretofore unavailable. These new dyes are much more basic than the aforesaid known dyes and the salts of the new dyes are more stable than the salts of the aforesaid known dyes.

I prepare the azamethine dyes represented by Formula II above by heating a β-cycloylpropionitrile selected from those represented by the following general formula:

III:

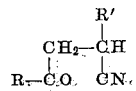

wherein R and R′ have the values given above and R′ can, in addition, represent a carboxyl group, with a hydroxylamine salt, e. g. hydroxylamine chloride, hydroxylamine nitrate, hydroxylamine sulfate, etc.

In my new process, the dyes are sometimes obtained in their ammonium salt form which can be represented by the following general formula:

IV.

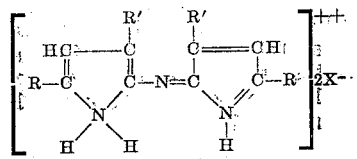

wherein R and R′ have the values given above, and X represents an acid group, i. e. an anion, e. g. an anion the atomic weight of which is from the atomic weight of the chloride anion to the atomic weight of the iodide anion, for instance, the chloride anion, the bromide anion, the nitrate anion, the hydrosulfate anion, the acetate anion, the iodide anion, etc. These ammonium salt forms where R′ represents an aryl group hydrolyze rapidly even in ordinary atmospheres to give the free base form of the dyes shown in Formula II above. The ammonium salt forms of all the dyes can be converted to the free base forms by treating the ammonium salt forms with aqueous alkalies, e. g. sodium or potassium hydroxide.

The azamethine salts obtained by my new process have melting points in excess of 300° C. The free bases can be quaternarized (i. e. converted to quaternary ammonium salt forms) by heating with alkyl salts, e. g. methyl iodide, ethyl iodide, methyl p-toluenesulfonate, methyl benzenesulfonate, n-propyl bromide, n-butyl chloride, isobutyl iodide, diethyl sulfate, etc.

Advantageously, in my process, the heating is effected in ethyl alcohol or in aqueous ethyl alcohol or in water or in any other solvent which dissolves both reactants, i. e. the nitrile and the salt. The heating is advantageously done at from about 60 to about 150° C., although other temperatures can be employed.

When R' in the above Formula III for the original β-cycloylpropionitrile is a carboxyl group, carbon dioxide is lost during the reaction to yield a dye in which R' is a hydrogen atom. The hydroxylamine salt is advantageously employed in excess; for example one molecular proportion of nitrile and 4 molecular proportions of hydroxylamine salt will give a yield of dye as high as 90 per cent in some cases. It has been found that in the case where R' in the above formula for the original β-cycloylpropionitrile is phenyl, somewhat higher temperatures of heating are advantageously employed, for example approximately 120° C. The new azamethine dyes can be sulfonated if desired.

The azamethine dyes are very stable blue dyes or pigments which are valuable for coloring layers in sensitive and non-sensitive photographic materials. For example, the dyes can be dispersed in layers of gelatin or of synthetic resins, such as polyvinyl phthalate, the pH being preferably adjusted to less than 3 in gelatin and less than 7 in polyvinyl phthalate. The dyes also find application in color photography in the imbibition process.

The preparation of dyes by my new process will be further illustrated by the following examples:

*Example 1. — 2-bis(5-phenylpyrrole) azamethine dihydrochloride*

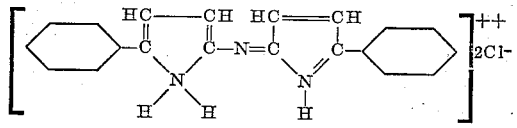

β-Benzoylpropionitrile (4.77 g.), hydroxylamine hydrochloride (4.2 g.) and industrial spirit (ethyl alcohol) (20 cc.) were refluxed for 1 hour. The precipitated dye was collected when cold, washed with acetone and dried. It was in the form of bronze crystals which gave a blue solution in ethyl alcohol. The dye can be recrystallized from pyridine or from acetic acid.

*Example 2. — 2-bis(5-phenylpyrrole) azamethine sulfate*

The sulfate of the same dye shown in Example 1 was obtained as glittering bronze crystals by refluxing β-benzoylpropionitrile (1 mol.) and hydroxylamine sulfate (2 mols.) in spirit (ethyl alcohol) for 2 hours.

*Example 3. — 2-bis(5-p-methoxyphenylpyrrole) azamethine dihydrochloride*

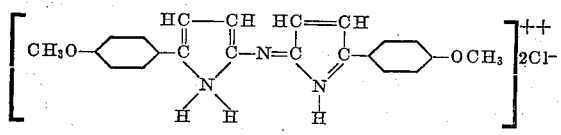

β-p-Methoxyphenylpropionitrile (6.75 g.), hydroxylamine hydrochloride (5.6 g.) and industrial spirit (ethyl alcohol) (20 cc.) were refluxed for 2 hours. The dye which precipitated was filtered off and washed with acetone. The dye was in the form of coppery crystals which can be recrystallized from pyridine.

*Example 4.— 2 - bis(5-p-hydroxyphenylpyrrole)- azamethine dihydrochloride*

β-p-Hydroxybenzoylpropionitrile (17.5 g.), hydroxylamine hydrochloride (14 g.) and spirit (ethyl alcohol) (100 cc.) were refluxed for 2 hours. The crystals which formed were collected, washed with acetone and dried. The crystals were green in color and gave a green solution in aqueous sodium hydroxide and a blue solution in organic solvents, e. g. in methyl alcohol or acetone.

*Example 5.— 2 - bis (5 - 1'-naphthylpyrrole) azamethine dihydrochloride*

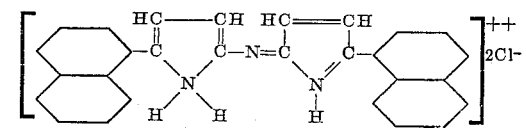

β-1-naphthoylpropionitrile (2.09 g.), hydroxylamine hydrochloride (2.8 g.) and spirit (ethyl alcohol) (10 cc.) were refluxed for 1 hour. The dye which formed was collected and washed with acetone. It was in the form of a bronze, crystalline powder. It can be recrystallized from acetic acid or from pyridine.

*Example 6.—2-bis(5-2'-thienylpyrrole) azamethine dihydrochloride*

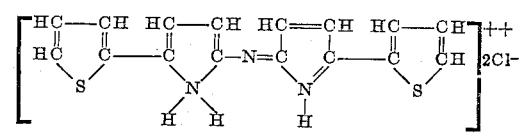

β-2-thienylpropionitrile (1.65 g.), hydroxylamine hydrochloride (2.8 g.) and spirit (ethyl alcohol) (20 cc.) were refluxed for 2 hours. The dye which formed was collected and washed with acetone. It was in the form of a bronze powder and the yield was low.

*Example 7.—2-bis(5 - 4' - methylphenylpyrrole)- azamethine dihydrochloride*

β-4-methylbenzoylpropionitrile (8.65 g.), hydroxylamine hydrochloride (14.9 g.) and spirit (ethyl alcohol) (50 cc.) were refluxed for one hour. The dye which formed was collected when the reaction mixture was cold. The dye was washed with acetone, water and again with acetone. It was in the form of a bronze crystalline powder.

*Example 8.— 2 - bis(5-phenylpyrrole) azamethine monohydrochloride*

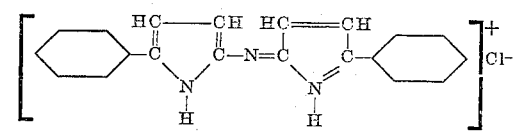

β-Benzoylpropionitrile (1.59 g.), hydroxylamine hydrochloride (1.4 g.) and water 20 cc.) were refluxed for 2 hours. Acetone (20 cc.) was added to the cool reaction mixture and the free base which precipitated was collected. Recrystallized from n-butanol it formed tiny pointed needles, M. P. 242° C. This same free base was obtained by treating the azamethine dihydrochloride of Example 1 with aqueous sodium hydroxide.

Example 9.—2′-bis(5′-phenylpyrrol)azamethine dihydrochloride

β-Benzoylpropionitrile (4.77 g.), hydroxylamine hydrochloride (2.1 g.) and n-butyl alcohol (10 cc.) were refluxed for 45 minutes by which time the whole had solidified. The dye was broken up under acetone, collected and washed with acetone.

Example 10.—2-bis(5-m-methoxyphenylpyrrole)-azamethine dihydrochloride

β-m-Methoxybenzoylpropionitrile (3.8 g.), hydroxylamine hydrochloride (5.6 g.) and industrial spirit (ethyl alcohol) (20 cc.) were refluxed for 2 hours. After chilling the reaction mixture, the dye was collected, washed with methanol and acetone, and recrystallized from acetic acid whereupon it was obtained as bronze needles.

Example 11.—2-bis(5-phenylpyrrole)azamethine dihydrochloride

α-Cyano-β-benzoylpropionic acid (α-carboxy-β-benzoylpropionitrile) (22 g.), hydroxylamine hydrochloride (14 g.) and industrial spirit (ethyl alcohol) (100 cc.) were refluxed for 90 minutes by which time the dye had crystallized out. It was collected, washed with a little spirit (ethyl alcohol), then acetone and dried. It was recrystallized from pyridine and obtained as purple needles.

Example 12.—2 - bis(3 : 5 - diphenylpyrrole)azamethine

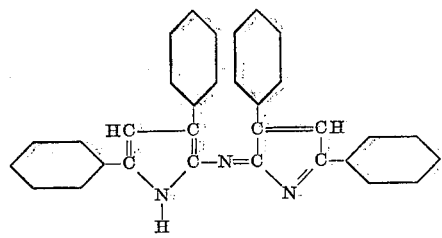

(a) β-Benzoyl-α-phenylpropionitrile (4.7 g.; 0.02 mol.), hydroxylamine hydrochloride (1.4 g.; 0.02 mol.) and ethylene glycol (20 cc.) were heated at 120° C. in an oil bath for 2 hours. The dye separated as coppery crystals. These were collected when the reaction mixture was cold and recrystallized from nitrobenzene whereupon the dye was obtained as short needles, melting at 286° C.

(b) Proceeding as in (a) above, but using n-butyl alcohol (20 cc.) as the solvent instead of ethylene glycol, and refluxing for 2 hours, the deep blue solution deposited 2-bis(3:5-diphenylpyrrole)azamethine dihydrochloride upon chilling. The purple solid rapidly acquired a coppery sheen on standing in the atmosphere owing to hydrolysis of the dihydrochloride to the free base (M. P. 286° C.).

(c) β-Benzoyl-α-phenylpropionitrile (4.7 g.), hydroxylamine hydrochloride (1.4 g.) and formamide (20 cc.) were placed in an oil bath at 120° C. The temperature of the reaction mixture rose to 90° C., then with evolution of gas, the temperature rose to 150° C. and the dye separated out. It was collected after diluting the reaction mixture with ethyl alcohol, ground with ethyl alcohol and then washed with ethyl alcohol and water. It had M. P. of 286° C. and was identical with the dye prepared according to (a).

α-Carboxy-β-benzoylpropionitrile can be prepared from the corresponding β-aroylacrylic acid by treatment with an alkali cyanide (see Bougault, Ann. chim. phys., 15, 504 (1908)). The β-aroyl-acrylic acid can be prepared by known methods, for example from an aromatic hydrocarbon, maleic anhydride and aluminium chloride, or from a β-bromo-β-aroylpropionic acid and an alkali salt, such as sodium acetate.

β-Benzoylpropionitrile can be prepared from phenyl vinyl ketone and hydrogen cyanide. Allen et al., J. Org. Chem., 2, 227 (1937).

I have found a simple method for preparing β-cycloylpropionitriles which comprises heating a β-dialkylaminoethyl cyclyl ketone salt selected from those represented by the following general formula:

V.

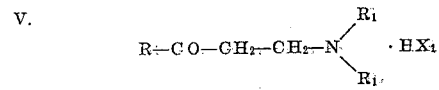

wherein R represents the value given above, i. e. a cyclyl group, e. g. phenyl, naphthyl, 2-thienyl, 2-furyl, 2-thiazolyl, carbazyl, tetralinyl, etc., $R_1$ represents an alkyl group, e. g. methyl, ethyl, n-propyl, n-butyl, isobutyl, etc., and $X_1$ represents an anion, e. g. chloride, hydrosulfate, bromide, iodide, etc., with a metal cyanide. The metal cyanide is advantageously water soluble; e. g. an alkali metal cyanide, for instance sodium or potassium cyanide.

The course of the reaction can be illustrated for a specific embodiment as follows:

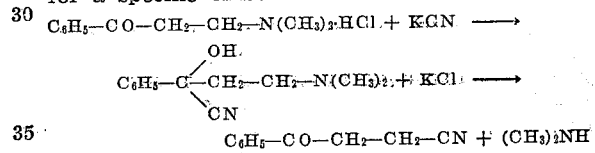

$$C_6H_5-CO-CH_2-CH_2-CN + (CH_3)_2NH$$

The dialkylamine liberated during the reaction can be recovered by steam distillation and absorption in dilute hydrochloric acid.

The most suitable reaction time, temperature and dilution of the reactants will vary somewhat, depending upon the particular β-dialkylaminoethyl cyclyl ketone salt employed. Generally speaking the cleanest products and highest yields of nitrile are obtained when the metal cyanide is employed in excess of the theoretically required amount and at a dilution of not greater than 5 per cent. The reaction time will vary between 5 and 60 minutes, although 20 minutes at 100° C. gives about the best yields, in most cases.

In most cases, the nitrile crystallizes on cooling the reaction mixture, but in the case where R represents 2-furyl, the nitrile must be extracted from the aqueous reaction mixture by a water immiscible solvent, such as chloroform, ether or benzene. The yield of nitrile varies between 30 and 70 per cent depending on the nature of the starting β-dialkylaminoethyl cyclyl ketone salt.

The nitriles are readily hydrolyzed to β-cycloylpropionic acids on refluxing the nitrile with aqueous hydrochloric acid, e. g. with equal volumes of water and concentrated hydrochloric acid (sp. g. 1.18). In this way β-cycloylpropionic acids are made readily available which cannot be prepared by the normal method, e. g. β-2-furoylpropionic acid is readily prepared as well as substituted β-benzoylpropionic acids in which the substituents are not situated in the para position.

The following examples will serve to illustrate further the preparation of β-cycloylpropionitriles.

Example 13.—β-Benzoylpropionitrile

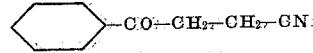

(a) β-Dimethylaminopropiophenone hydrochloride (213.5 g.; 1 mol.), potassium cyanide (71.5 g.; 1.1 mol.) and water (1400 cc.) were refluxed for 60 minutes. The β-benzoylpropionitrile separated as an oil which crystallized upon cooling and a further quantity crystallized from the liquor. Recrystallized from benzene-light petroleum, the β-benzoylpropionitrile formed almost colorless blades M. P. 76° C. Yield 67 per cent.

(b) Crude β-diethylaminopropiophenone hydrochloride was prepared by refluxing for 2 hours acetophenone (1 g.; 1 mol.), paraformaldehyde (1.3 g.; 1 mol.) diethylamine hydrochloride (1.35 g.; 1 mol.) concentrated hydrochloric acid (2 cc.) and ethyl alcohol (160 cc.) and then precipitating the total salts with anhydrous diethyl ether. Yield 901 g. from 500 g. of diethylamine hydrochloride. The crude salt (24.1 g.), potassium cyanide (13.0 g.) and boiling water (520 cc.) were refluxed for 20 minutes. The nitrile obtained after one recrystallization from benzene-light petroleum represented a 48 per cent yield based on the diethylamine hydrochloride.

(c) The aforesaid crude salt (24.1 g.), potassium cyanide (13 g.) and boiling water (260 cc.) refluxed for 10 minutes gave a 43% yield of nitrile based on diethylamine hydrochloride.

(d) Same as in (c) but refluxed for 30 minutes gave a 46 per cent yield of the nitrile.

(e) The aforesaid crude salt (24.1 g.), potassium cyanide (7.1 g.) and boiling water (100 cc.) gave after refluxing for 45 minutes a 45 per cent yield. The hydrolysis of this nitrile to the corresponding acid has been described by Allen et al. (loc. cit.).

*Example 14.—β-4-methoxybenzoylpropionitrile*

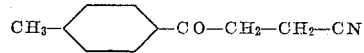

β-Dimethylamino-p-methoxypropiophenone hydrochloride (24.35 g.) obtained from p-methoxyacetophenone, paraformaldehyde and dimethylamine hydrochloride by the method of Mannich and Lammering (Ber., 55, 3510 (1922)) in 86 per cent yield, potassium cyanide (13 g.) and boiling water (520 cc.) were refluxed for 20 minutes. On cooling the nitrile crystallized. It was recrystallized from ethyl alcohol and obtained as colorless needles, M. P. 95° C., in 71 per cent yield.

This nitrile (2 g.) was refluxed for 60 minutes with concentrated hydrochloric acid (10 cc.) and water (10 cc.). The oil solidified during this process. Upon recrystallizing the oil from hot water, colorless needles of β-4-methoxybenzoylpropionic acid, M. P. 144° C., were obtained.

*Example 15.—β-4-hydroxybenzoylpropionitrile*

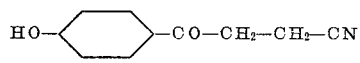

β-Hydroxyacetophenone (25 g.), paraformaldehyde (7.2 g.), dimethylamine hydrochloride (20 g.), concentrated hydrochloric acid (0.75 cc.) and ethyl alcohol (99 per cent) (30 cc.) were refluxed for 60 minutes. After 10 minutes the whole had almost completely solidified. The solid was collected and recrystallized from ethyl alcohol forming glistening plates of β-dimethylamino-p-hydroxypropiophenone hydrochloride, M. P. 198° C., in 76 per cent yield. The hydrochloride (22.95 g.; 0.1 mol.), potassium cyanide (13 g.; 0.2 mol.) and boiling water (520 cc.) were refluxed for 30 minutes. The clear, yellow solution was cooled and acidified in the fume cupboard. The required nitrile was thus precipitated as glistening, colorless crystals. From ethyl alcohol it formed flat needles, M. P. 162° C. with previous softening, in 59 per cent yield.

This nitrile (2 g.) was refluxed with hydrochloric acid and water as in Example 14. The p-hydroxybenzoylpropionic acid, however, was water soluble and crystallized only on cooling. From hot water it formed almost colorless needles, M. P. 157° C. in 95 per cent yield.

*Example 16.—β-2-furoylpropionitrile*

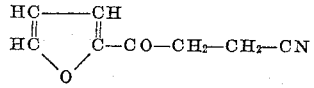

β-Dimethylaminoethyl 2-furyl ketone hydrochloride (81.4 g.) prepared according to the instructions of Levy and Nisbet (J. Chem. Soc. 1938, 1055), potassium cyanide (57 g.) and boiling water (2850 cc.) were refluxed for 20 minutes, cooled rapidly and the clear, orange liquor extracted repeatedly with chloroform. The dried chloroform extract was evaporated, leaving a brown oil which solidified completely. From ethyl alcohol, the nitrile formed almost colorless needles, M. P. 74–76° C.

This nitrile (2 g.) was refluxed for 60 minutes with concentrated hydrochloric acid (10 cc.) and water (10 cc.). The reaction mixture was then evaporated to dryness. The crystalline solid was recrystallized from hot water and formed shiny, flat, fawn needles, M. P. 119° C. with previous softening, of β-2-furoylpropionic acid, in 95 per cent yield.

What I claim as my invention and desire to be secured by Letters Patent of the United States is:

1. An azamethine dye selected from the group consisting of those represented by the following general formula:

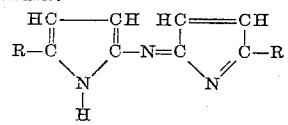

wherein R represents a member selected from the group consisting of a monocylic aryl group of the benzene series, an aryl group of the naphthalene series, a 2-thienyl group, a 2-furyl group, a 2-thiazolyl group, a carbazyl group and a tetralinyl group, and the ammonium and quaternary ammonium salt forms of said dye.

2. An azamethine dye selected from the group consisting of those represented by the following general formula:

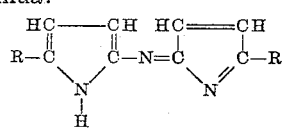

wherein R represents a monocyclic aryl group of the benzene series the atomic weight of which is from the atomic weight of the phenyl group to the atomic weight of the p-iodophenyl group, and the ammonium and quaternary ammonium salt forms of said dye.

3. An azamethine dye selected from the group consisting of those represented by the following general formula:

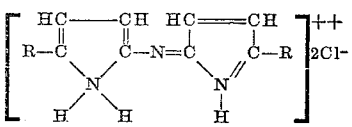

wherein R represents a naphthyl group.

4. The azamethine dye represented by the following formula:

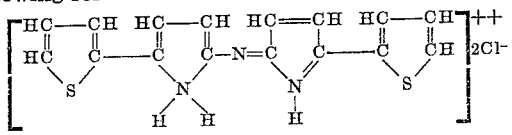

5. The azamethine dye which is represented by the following formula:

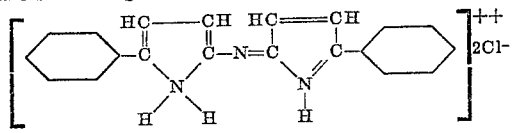

6. The azamethine dye which is represented by the following formula:

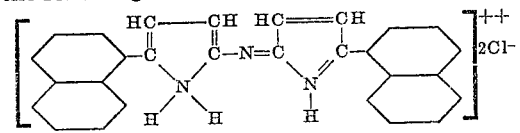

7. A process for preparing an azamethine dye which comprises heating a hydroxylamine salt with a β-cycloylpropionitrile selected from those represented by the following general formula

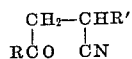

wherein R represents a member selected from the group consisting of a monocyclic aryl group of the benzene series, an aryl group of the naphthalene series, a 2-thienyl group, a 2-furyl group, a 2-thiazolyl group, a carbazyl group and a tetralinyl group, and R' represents a member selected from the group consisting of a hydrogen atom, an alkyl group containing from 1 to 4 carbon atoms, a monocyclic aryl group of the benzene series, an aryl group of the naphthalene series and a carboxyl group.

8. A process for preparing an azamethine dye which comprises heating a hydroxlylamine salt with a β-cycloylpropionitrile selected from those represented by the following general formula:

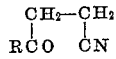

wherein R represents a monocyclic aryl group of the benzene series the atomic weight of which is from the atomic weight of the phenyl group to the atomic weight of the p-iodophenyl group.

9. A process for preparing an azamethine dye which comprises heating hydroxylamine hydrochloride with a β-cycloylpropionitrile selected from those represented by the following general formula:

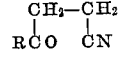

wherein R represents a monocyclic aryl group of the benzene series the atomic weight of which is from the atomic weight of the phenyl group to the atomic weight of the p-iodophenyl group.

10. A process for preparing an azamethine dye which comprises heating at from 60 to 150° C. hydroxylamine hydrochloride with a β-cycloylpropionitrile selected from those represented by the following general formula:

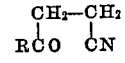

wherein R represents a monocyclic aryl group of the benzene series the atomic weight of which is from the atomic weight of the phenyl group to the atomic weight of the p-iodophenyl group.

11. A process for preparing an azamethine dye which comprises heating at from 60 to 150° C. in a solvent for the reactants, hydroxylamine hydrochloride with a β-cycloylpropionitrile selected from those represented by the following general formula:

wherein R represents a monocyclic aryl group of the benzene series the atomic weight of which is from the atomic weight of the phenyl group to the atomic weight of the p-iodophenyl group.

12. A process for preparing an azamethine dye which comprises heating a hydroxylamine salt with a β-cycloylpropionitrile selected from those represented by the following general formula:

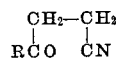

wherein R represents a naphthyl group.

13. A process for preparing an azamethine dye which comprises heating hydroxylamine hydrochloride with a β-cycloylpropionitrile selected from those represented by the following general formula:

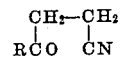

wherein R represents a naphthyl group.

14. A process for preparing an azamethine dye which comprises heating, at from 60 to 150° C., hydroxylamine hydrochloride with a β-cycloylpropionitrile selected from those represented by the following general formula:

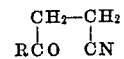

wherein R represents a naphthyl group.

15. A process for preparing an azamethine dye which comprises heating, at from 60 to 150° C. in a solvent for the reactants, hydroxylamine hydrochloride with a β-cycloylpropionitrile selected from those represented by the following general formula:

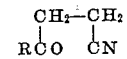

wherein R represents a naphthyl group.

16. A process for preparing an azamethine dye which comprises heating a hydroxylamine salt with β-2-thienylpropionitrile.

17. A process for preparing an azamethine dye which comprises heating hydroxylamine hydrochloride with β-2-thienylpropionitrile.

18. A process for preparing an azamethine dye which comprises heating, at from 60 to 150° C., hydroxylamine hydrochloride with β-2-thienylpropionitrile.

19. A process for preparing an azamethine dye which comprises heating, at from 60 to 150° C. in a solvent for both of the reactants, hydroxylamine hydrochloride with β-2-thienylpropionitrile.

EDWARD BOWES KNOTT.

No references cited.